United States Patent [19]
Kalamaras

[11] Patent Number: 6,116,181
[45] Date of Patent: Sep. 12, 2000

[54] BOAT HULL WITH WOOD GRAIN FINISH

[76] Inventor: Michael P. Kalamaras, 17 Lorraine Ct., Cary, Ill. 60013

[21] Appl. No.: 09/323,686

[22] Filed: Jun. 2, 1999

[51] Int. Cl.[7] ................................ B63B 5/24; B63B 3/00
[52] U.S. Cl. ............................................ 114/357; 114/355
[58] Field of Search ..................... 114/357, 382, 114/84, 85

[56] References Cited

U.S. PATENT DOCUMENTS

| | | |
|---|---|---|
| 1,685,396 | 9/1928 | Brown . |
| 4,483,267 | 11/1984 | Seemann . |
| 4,739,722 | 4/1988 | Rogstad . |
| 4,743,509 | 5/1988 | Kokrhanek ........................... 428/425.1 |
| 4,931,124 | 6/1990 | Buam . |
| 5,017,322 | 5/1991 | Brooks . |
| 5,145,744 | 9/1992 | Cartier et al. ........................ 428/423 |
| 5,207,172 | 5/1993 | Wolter . |
| 5,601,049 | 2/1997 | Hordis et al. . |
| 5,606,003 | 2/1997 | Wang et al. ........................... 528/60 |
| 5,894,048 | 4/1999 | Eckart et al. ........................ 428/339 |
| 5,916,666 | 6/1999 | Huber et al. ........................ 428/195 |

*Primary Examiner*—S. Joseph Morano
*Assistant Examiner*—Patrick Craig Muldoon

*Attorney, Agent, or Firm*—James Creighton Wray; Meera P. Narasimhan

[57] ABSTRACT

A wood grain printed film showing strakes, rails, screws, plugs and caulk is affixed to the outside of fiberglass hulls to provide the appearance of a wood hull boat. The film is adhered to the gel coat by cross-linking to provide a unitary, rigid, resilient structure with impact and abrasion resistance for protecting the gel coat and the watertight integrity of the hull. One or more clear seal coats applied over the wood grain printed film provides a deeply varnished look and beauty of a classic wood boat. The print on the film is designed and printed in a printer which is controlled by the same computer software with which the hull is designed so that the printed film matches the structure of the boat. The printed film is applied to the exterior and interior of the hull and to decks, bulkheads and hatches throughout the boat to give the appearance of a finished wooden boat while providing the added protection of a tough, impact and abrasion resistant film which protects the boat structures. The wood print may be augmented or replaced with advertising symbols or other decorative print particularly designed for placement on the underlying surfaces.

23 Claims, 1 Drawing Sheet

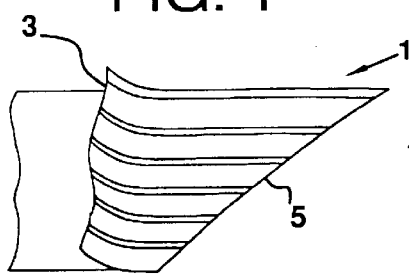
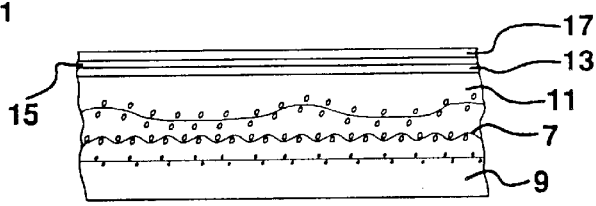
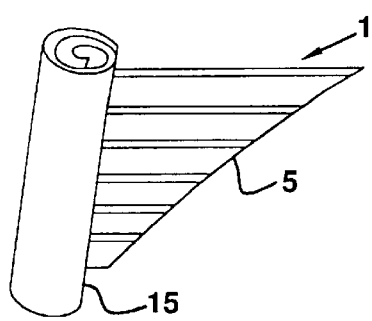
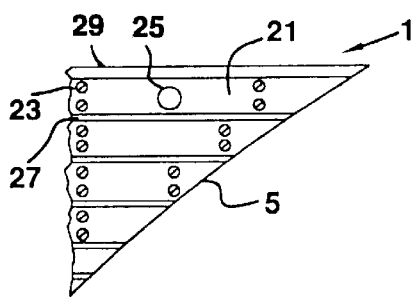
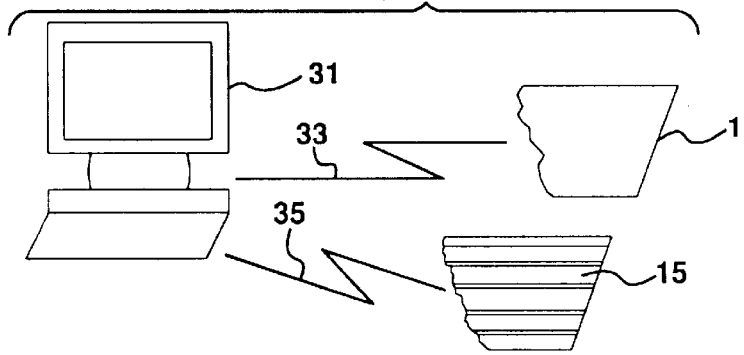
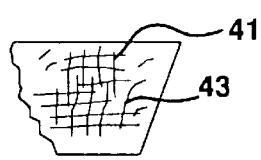
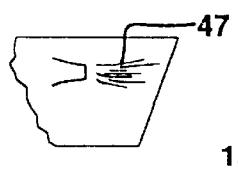
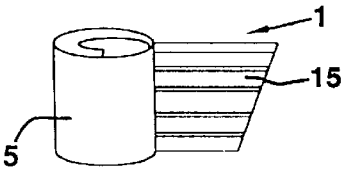
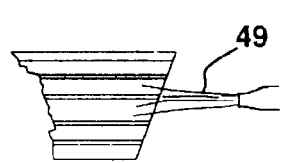

BOAT HULL WITH WOOD GRAIN FINISH

BACKGROUND OF THE INVENTION

The fiberglass boat has been in existence for many years. It was first introduced to replace wood boat hulls. The benefits of a fiberglass boat versus a wood boat are substantial. A fiberglass boat is less expensive to produce, and maintenance costs and care of the boat are much less expensive than that of a wood boat.

The wood boat is, as some state, a classic, showing the beauty of wood grain with a deeply varnished look. This look is not available with a fiberglass boat. A fiberglass boat has only a solid colored gel coat exterior finish. A wood boat shows a beautiful polished wood deck. There is no comparison between the two as to which boat is more beautiful to look at.

SUMMARY OF THE INVENTION

The present invention combines the manufacturing of a fiberglass boat with the beauty of a wood boat. The boat is made of fiberglass. The methods of manufacturing a fiberglass boat would not change as it exists today. Using the invention, the exterior gel coat finish of a fiberglass boat is covered with a digitally produced four-color process laminate. The laminate has a substrate compatible with the fiberglass boat gel coat exterior. The laminate thickness is very thin. It may be described as a film that is flexible, and which is fused, copolymerized, bonded or glued, or adhered to the gel coat finish with a compatible solvent. The film when applied conforms to the fiberglass boat exterior shape. Applying the new four-color process film to the fiberglass boat produces a beautiful classic wood boat look combined with the low cost and durability of a fiberglass boat.

This new process opens the door for any advertising application by outputting detailed graphics on to the fiberglass boat. Once the graphics are applied to the fiberglass boat, a final resin is sprayed on or applied by roller, brush or other applicator to seal the outer surface of the boat. The boat is finished and has a classic wood boat look or any advertising look combined with the low cost features and maintenance of a fiberglass boat.

The present invention creates a 40's-style boat out of fiberglass then adds a wood grain surface that looks like it has ten coats of varnish. The invention provides for advertising on fiberglass boats using photographic film surfaces on fiberglass boats. The film may be a laminate or a single layer. A bond is created by using solvent between the surface and the plastic film for polymerizing the film to the boat surface. The film is used for sides, decking and bulkheads. The films are generated by computers and digital output printers 6 feet wide and about ≈0.010" to ≈0.005" (5 to 10 mils) thick. The films flex to follow hull curvatures.

The films are adhered to a fiberglass boat with a solvent and therefore become one with the boat and part of the boat.

A first step designs wood and board simulations on a computer to fit the entire outside of the boat. A resulting four-color process picture gives the appearance of real wood, depicting screws, plugs and caulking and wood rails.

A preferred reinforced boat hull has multiple reinforcements, fibers and strands, a rigid and resilient matrix and a toughening filler surrounding the fiber and strand reinforcements, and in which the strands and fibers are embedded. The rigid plastic matrix has exterior and interior surfaces. A gel coat overlies the exterior surface. The gel coat has outer and inner surfaces. The inner surface is firmly adhered to the exterior surface of the plastic matrix.

A four-color wood grain simulating film has a substrate firmly adhered to an outer surface of a gel coat and has a decorative surface integrally connected with the substrate.

A sealant coat covers and firmly adheres to the decorative surface of the film. Preferably multiple finish layers overlie the sealant coat.

A second four-color wood grain simulating laminate has a substrate firmly adhered to an interior of the hull. A decorative surface layer is integrally connected with the substrate to provide internal hull wood grained appearing surfaces within the boat.

Preferably the multiple reinforcement fibers and strands include fiberglass arranged in layers of fabric reinforcements.

The decorative film, for example, may be a thin, about 5 to 15 mil, flexible polystyrene film on which a computer-controlled printer prints the wood design.

A reinforced boat hull of the invention has a rigid and resilient resin matrix body with interior and exterior surfaces. Reinforcing fibers and strands are disposed in and extend through the body for reinforcing the matrix. Toughening particulate fillers are disposed in the matrix and are distributed throughout the body for toughening the body and the interior and exterior surfaces against impact and stress. Gel coats the interior and exterior surfaces of the matrix.

A wood grain film is provided in or on at least one of the gel coats for forming a wood boat appearing hull.

An outer seal coat covers the wood grain film and the gel coat for sealing the hull and providing a rigid, resilient hull with tough impact, abrasion and stress resistant coatings. Multiple finish layers overlie the sealant coat.

In one embodiment, the wood grain coating is a laminate having a substrate compatible with the gel coat and a decorative wood grain printed on the substrate.

The hull further has a second four-color wood grain simulating print on a substrate surface layer firmly adhered to an inner surface of the hull.

In one example a 5 mil printed polystyrene film is adhered to the outer gel coat and to the inner hull surface using a solvent. The solvent, for example, may be methylene chloride sprayed on the film gel coat or hull before pressing the film on the gel coat or hull. The cross linking or bonding is immediate. A retarder may be added to the solvent to delay the bonding to ensure the film is properly positioned and uniformly adhered on the hull.

The invention provides a boat coating comprising a wood grain-simulating laminate for adhering to a reinforced matrix boat structure by cross linking, adhesive bonding or fusing to a gel coat or a boat structure, having a substrate compatible with a gel coat on a boat structure and a wood grain decorative layer printed on the substrate.

The laminate is flexible for bending and following lines of a boat hull. In one form, the laminate, the substrate and the wood grain decorative layer are stretchable for following and laying smoothly on compound curvatures of a boat hull.

A new method of creating a finished wood appearance boat hull designs a boat hull with a computer, designs a finished wood appearance film with simulated strakes, boards, planks, screws, plugs and caulking to following the hull in parallel horizontal lines from stem to stern, and prints the finished wood appearance film with a computer-controlled printer in flexible, thin and wide sheets.

A gel coat is sprayed within a hull mold. A reinforcing fabric is added, while laying up the hull with reinforced fiberglass and a matrix material. The hull is removed from the mold before applying the printed film to the outer gel coat and adhering the printed film to the coat.

The applying includes applying a solvent to the outer gel coat and to the film and copolymerizing the outer gel coat and the film.

These and further and other objects and features of the invention are apparent in the disclosure, which includes the above and ongoing written specification, with the claims and the drawings.

BRIEF DESCRIPTION OF THE DRAWINGS

FIG. 1 shows a partial view of a boat hull.

FIG. 2 is a schematic view of layers of the boat hull according to the present invention.

FIG. 3 shows placing a film.

FIG. 4 is a partial view of the boat hull constructed according to the present invention.

FIG. 5 shows a computer for generating the shape of a boat hull and the same computer for generating the shape and design of the printed film.

FIG. 6 shows a partially constructed boat hull.

FIG. 7 shows a gel coat partially covering the boat hull.

FIG. 8 generally represents the spraying of the boat hull gel coat with solvent and retarder.

FIG. 9 shows a wide film of the present invention being applied to the boat hull after the boat hull and/or the sheet is sprayed with a solvent and retarder.

FIG. 10 shows finishing the boat hull with sprayed coating layers.

DETAILED DESCRIPTION OF THE PREFERRED EMBODIMENTS

Referring to FIG. 1, a fiberglass boat hull is generally indicated by the numeral 1. The wood decorating trim 3 is shown partially applied to the boat hull.

The wood decorating trim is applied from the stem 5 of the hull 1 to the stern on both sides of the boat.

FIG. 2 shows a cross-section of a boat hull having fabric 7 and fibers 9 embedded in a resin matrix 11. A gel coat 13 covers an outside of the hull. A four-color wood laminate 15 is added to the gel coat, and a seal coat 17 is applied over the decorative laminate 15.

FIG. 3 shows the boat hull 1 to which the laminate is being applied. A rolled sheet of the four-color laminate 15 may be applied to the boat hull by spraying the sheet or the hull or both, and unrolling the sheet over the hull followed by subsequent trimming of the sheet to fit the hull.

FIG. 4 shows the finished product in partial view with the wood simulation laminate 15 applied on the hull 1. The laminate has printed photographic reproduction of boards or strakes 21 with representations of screws 23, plugs 25 and caulking 27. The wood grain laminate also has printed thereon rails 29, which give the appearance of a complete wood hull.

As shown in FIG. 5, a computer 31 is used to generate a design 33 of a boat hull 1. The same computer using the same inputs is used to design 35 the particular shape and element positions of the wood grain laminate 15 for the particular boat hull 1.

FIG. 6 shows the fiberglass hull in partial completion. Fiberglass reinforcement fabric 41 is positioned on a partially laid resin 43.

FIG. 7 shows the gel coat 13 on an outer surface 45 of the resin.

FIG. 8 shows the spraying 47 of a solvent on the gel coat, and FIG. 9 shows the unrolling and applying of the specially created wood simulation laminate 15 on the hull 1.

FIG. 10 shows the spraying 49 of a sealant and overcoats to provide the deep wood grain appearance.

The wood grain laminate film may be constructed of a 5 to 15 mil polyethylene film, which passed through a large 6 foot printer which on which four-color depictions of wood grain are printed. The wood grain may be fanciful or may be constructed from pictures showing the wood grain boards, planks or strakes, screw fasteners, plugs and caulk and rails. Before applying the film, the back of the film and the gel coat are sprayed with a solvent such as methylene chloride. The contacting of the decorative film to the hull immediately secures the film to the hull. A retarder may be mixed with the solvent that is sprayed so that time is provided to readjust the film on the hull or to carefully smooth and press out all surface irregularities, if any. A rapid pressure on the hull, such as by a flexible roller, secures the polystyrene film to the hull. The polystyrene film forms a tough, resilient lubricating and self-healing surface which is impact, scratch, tear and abrasion resistant and is suitable for use without further coating. Once applied to the hull, the polystyrene film forms with the hull a rigid, resilient structure.

A preformed bow trim strip constructed and printed in the same manner may be cross-linked with the forward edge of the hull or the film thereon to further finish the forward edge with the appearance of a wood trim.

A similar film may be added to the interior of the hull to provide the appearance of a full wooden hull. Similar films may be applied to decks and bulkheads. When applied to the interior of the hull or to decks, hatches and bulkheads, the film may be applied directly over the fiberglass resin matrix or may be applied on a gel coat formed on the interior of the hull.

In laying up the boat hull, a mold is coated with a release coat, followed by a gel coat. Resin and impregnated fibers are sprayed onto the gel coat, and reinforcing fabrics are added, followed by more resin and fiber spraying in subsequent steps until the hull is complete. While still in the mold or after removal from the mold, equipment, deck and bulkhead supports are added to the hull interior. Joints of the supports with the hull may be coated with further reinforced resin.

After removal of the hull from the mold, the decorative film is added. While a decorative wood film is preferred, the decorative film may show any computer-generated photographic print or any symbol, such as large advertisements. Fiberglass bulkheads and decks are formed in molds, and the decorative wood grain simulating films are applied to the bulkheads and decks before or after they are assembled on the hull. The tough films improve the surface toughness and protect the underlying gel coats and fiberglass reinforced resin structures.

In alternate forms of the invention, the generated decorative film may be applied to the inside of the mold with a tacking agent. The tacking agent is applied to the mold, followed by the film, followed by a cross linking agent and a gel coat or the fiber-impregnated resin, followed by reinforcement fabrics, more fiber-impregnated resin, more fabrics and more resin until the hull is finished. Releasing the tacking agent then releases the entire hull from the mold.

While particular materials for construction and adherence of the new film have been described by way of example, any suitable film-forming polymer may be employed and any adhering method or agent may be employed which is commensurate with providing a strong, durable hull surface.

While the invention has been described with reference to specific embodiments, modifications and variations of the invention may be constructed without departing from the scope of the invention, which is defined in the following claims.

I claim:

1. A reinforced fiberglass boat hull comprising:
   multiple reinforcement fibers;
   a rigid and resilient plastic matrix and a toughening filler surrounding the reinforcement fibers and in which the fibers are embedded, the rigid plastic matrix having exterior and interior surfaces; and
   a gel coat overlying the exterior surface, the gel coat having outer and inner surfaces, the inner surfaces firmly adhered to the matrix exterior surfaces; and
   a preformed computer-generated four-color wood grain simulating plastic laminate on the outer surface of the gel coat.

2. The hull of claim 1, further comprising a sealant coat covering and firmly adhered to the wood grain-simulating plastic laminate.

3. The hull of claim 2, further comprising multiple finish layers overlying the sealant coat.

4. The hull of claim 1, further comprising a second four-color wood grain simulating plastic laminate firmly adhered to the interior surface of the matrix and forming a wood grain appearance on an inside of the hull.

5. The hull of claim 1, wherein the wood grain simulating plastic laminate further comprising an about 0.005 to about 0.020 inch thick styrene sheet attached by methylene chloride solvent to the gel coat.

6. A reinforced fiberglass boat hull comprising:
   a rigid and resilient matrix having a boat hull body with interior and exterior surfaces;
   reinforcing fibers and strands disposed in and extending through the boat hull body for reinforcing the matrix;
   toughening particulate fillers disposed in the matrix and distributed throughout the boat hull body for toughening the body and the interior and exterior surfaces against impact and stress; and
   a gel coat coating the exterior surface of the matrix; and
   a computer-generated plastic wood grain and wood plank-simulating coating in or on the gel coat for protecting the gel coat and forming a decorative wood grain and wood plank-simulating hull exterior.

7. The hull of claim 6, wherein the wood grain coating comprises a laminate having an about 0.005 to 0.020 inch thick polystyrene sheet attached to the gel coat by methylene chloride solvent fusing, and providing a decorative wood grain layer simulating wood planks integral with the hull.

8. The hull of claim 6, further comprising a second four-color wood grain simulating laminate firmly adhered to the interior surface.

9. The hull of claim 6, further comprising an outer seal coat covering the wood grain and wood plank-simulating coating for sealing the coatings and providing a rigid, resilient hull with tough impact, abrasion and stress resistant coatings.

10. The hull of claim 9, comprising multiple finish layers overlying the sealant coat.

11. A boat coating film comprising a laminate for adhering to a reinforced fiberglass matrix boat structure by copolymerizing, cross-linking, solvent bonding, adhesive bonding or fusing with a gel coat, the laminate being compatible with a gel coat on a boat structure and having a four-color decoration on the laminate for adhering the laminate to the gel coat of the boat structure.

12. The boat coating of claim 11, wherein the boat surface is a hull and the laminate is flexible for bending and following lines of a boat hull.

13. The boat hull of claim 11, wherein the laminate has a wood plank and wood grain-simulating decoration.

14. The boat coating of claim 13, wherein the laminate and the wood plank and wood grain-simulating decoration are stretchable for following and laying smoothly on compound curvatures of a boat hull.

15. A method of creating a finished wood appearance boat hull, comprising:
   designing a boat hull with a computer;
   designing a finished wood appearance film with simulated strakes, boards, planks, screws, plugs and caulking following the hull in parallel horizontal lines from stem to stern;
   printing the finished wood appearance film with a printer in flexible, thin and wide sheets;
   laying up the computer-designed hull with reinforced fiberglass and an outer coating; and
   applying the printed film to the outer coating and adhering the printed film to the coating.

16. The method of claim 15, wherein the applying comprises applying a solvent to the outer coating and to the film, and wherein the adhering comprises copolymerizing the outer coating and the film.

17. The method of claim 16, wherein the printed film is a polystyrene film from about 0.005 to about 0.020 inches thick.

18. The method of claim 17, wherein the applying of the solvent comprises applying methylene chloride to an inner surface of the film.

19. A method of creating a finished designer graphics or advertisement appearance on a boat hull, comprising:
   designing a boat hull with a computer;
   designing a finished graphics or advertisement appearance on film;
   printing the finished graphics or advertisement appearance film with a printer in flexible, thin and wide sheets;
   laying up the computer-designed hull with reinforced fiberglass and an outer coating; and
   applying the printed film to the outer coating and adhering the printed film to the coating.

20. The method of claim 19, wherein the finished graphics on a film are with simulated strakes, boards, planks, screws, plugs and caulking following the hull in parallel horizontal lines from stem to stern of the hull.

21. A boat hull lamination for a fiberglass boat hull having an outer gel coat comprising a wood grain printed film showing strakes, rails, screws, plugs and caulk affixed to an outside of fiberglass hulls for providing the appearance of a wood hull boat, wherein the film is adhered to the gel coat by cross-linking to provide a unitary, rigid, resilient structure with impact and abrasion resistance for protecting the gel coat and the watertight integrity of the hull, further comprising one or more clear seal coats applied over the wood grain printed film for providing a deeply varnished look and beauty of a classic wood boat, wherein the print on the film is designed and printed in a printer which is controlled by identical computer software with which the hull is designed so that the printed film matches the structure of the boat.

22. The boat hull lamination of claim 21, wherein the printed film is applied to the exterior and interior of the hull and to decks, bulkheads and hatches throughout the boat for giving an appearance of a finished wooden boat while providing the added protection of a tough, impact and abrasion resistant film which protects the boat interior and exterior structures.

23. The boat hull lamination of claim 21, wherein the wood print is augmented or replaced with advertising symbols or other decorative print particularly designed for placement on underlying surfaces of the hull.

* * * * *